United States Patent [19]

Herzig et al.

[11] Patent Number: 5,386,007
[45] Date of Patent: Jan. 31, 1995

[54] SILOXANE COPOLYMERS CONTAINING ALKENYL GROUPS, THEIR PREPARATION AND THEIR USE

[75] Inventors: Christian Herzig, Taching am See; Michael Geck, Burghausen; Alfred Rengstl, Reischach; Friedrich Hockemeyer, Marktl am Inn; Helmut Oswaldbauer, Stubenberg, all of Germany

[73] Assignee: Wacker-Chemie GmbH, Munich, Germany

[21] Appl. No.: 179,408

[22] Filed: Jan. 10, 1994

[30] Foreign Application Priority Data

Jan. 14, 1993 [DE] Germany ................ 4300809

[51] Int. Cl.6 .................................... C08G 77/06
[52] U.S. Cl. ................................ 528/12; 528/14; 528/15; 528/21; 528/23; 528/18; 528/32; 528/34
[58] Field of Search ............... 528/15, 32, 34, 12, 528/14, 18, 21, 23

[56] References Cited

U.S. PATENT DOCUMENTS 4,123,604 10/1978 Sandford .
5,231,157 7/1993 Herzig et al. ................ 528/15
5,241,034 8/1993 Herzig .

FOREIGN PATENT DOCUMENTS 0217333 9/1992 European Pat. Off. .
4123423 1/1993 Germany .

Primary Examiner—Melvyn I. Marquis
Attorney, Agent, or Firm—Martin Connaughton

[57] ABSTRACT

The present invention relates to siloxane copolymers containing alkenyl groups and a process for their preparation. The siloxane copolymers of the present invention can be used in cross-linkable compositions for the production of coatings which repel tacky substances, an example of which would include coatings for release papers or films.

9 Claims, No Drawings

SILOXANE COPOLYMERS CONTAINING ALKENYL GROUPS, THEIR PREPARATION AND THEIR USE

FIELD OF THE INVENTION

The present invention relates to resinous siloxane copolymers containing alkenyl groups and to a process for their preparation. The invention further relates to cross-linkable compositions which include a siloxane copolymer containing alkenyl groups, an organopolysiloxane containing Si-bonded hydrogen atoms and a catalyst, and to the use of the compositions.

BACKGROUND OF THE INVENTION

EP 217 333 B (Dow Corning Corp.; published on Sep. 2, 1992) describes xylene-soluble, resinous copolymers which contain $SiO_2$, trimethylsiloxy and alkenyldimethylsiloxy units and are suitable for regulating separating forces with respect to adhesives. U.S. Pat. No. 4,123,604 (Dow Corning Corp., issued on Oct. 31, 1978) describes the preparation of resinous siloxane copolymers using vinyldimethylsiloxy units. Both publications have the common feature that the molecular weight of the copolymers is determined by the ratio of monomeric siloxane units to quaternary siloxane units in the molecule.

SUMMARY OF THE INVENTION

The present invention relates to siloxane copolymers containing alkenyl groups, which include, (a) siloxane units of the formula

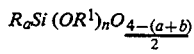  (I)

in which
R can be identical or different and represents aliphatically saturated organic radicals,
$R^1$ represents identical or different alkyl radicals, which can be substituted by ether oxygen atoms, or a hydrogen atom,
a is 0, 1, 2 or 3,
b is 0, 1 or 2 and the sum of a+b is not greater than 3, with the proviso that at least two siloxane units (a) where a+b=0 are present per molecule, (b) at least one siloxane unit per molecule of the formula

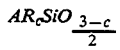  (II)

in which
R is the same as above
c is 0, 1 or 2 and
A represents a radical of the formula —$CH_2CH$-$R^3$—$R^2$—$CR^3$=$CH_2$ in which
$R^2$ represents a divalent hydrocarbon radical having 1 to 25 carbon atoms and
$R^3$ represents a hydrogen atom or an alkyl radical, and (c) at least one siloxane unit per molecule of the formula

  (III)

in which
R and c are the same as above and
$A^1$ represents a radical of the formula —$CH_2CH$-$R^3$—$R^2$—$CHR^3CH_2$— where
$R^2$ and $R^3$ are the same as above.

Examples of radicals R are alkyl radicals, such as the methyl, ethyl, n-propyl, iso-propyl, 1-n-butyl, 2-n-butyl, isobutyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, an example of which is the 2,2,4-trimethylpentyl radical; nonyl radicals, such as the n-nonyl radical; decyl radicals, such as the n-decyl radical; dodecyl radicals, such as the n-dodecyl radical; octa-decyl radicals, such as the n-octadecyl radical; and cycloalkyl radicals, such as cyclopentyl, cyclohexyl and cycloheptyl radicals, and methylcyclohexyl radicals.

Examples of halogenated radicals R are haloalkyl radicals, such as the 3,3,3-trifluoro-n-propyl radical, the 2,2,2,2′,2′,2′-hexafluoroisopropyl radical and the heptafluoroisopropyl radical.

The radical R is preferably an alkyl radical having 1 to 4 carbon atoms, the methyl radical being preferred.

Examples of radicals $R^1$ are the examples mentioned for the alkyl radical R, and the methoxyethyl and ethoxyethyl radical.

The radical $R^1$ is preferably alkyl radicals having 1 to 4 carbon atoms, the methyl and ethyl radical being preferred.

Examples of alkyl radicals $R^3$ are the examples mentioned for the alkyl radical R.

The radical $R^3$ is preferably a hydrogen atom or alkyl radical having 1 to 6 carbon atoms, the hydrogen atom being more preferred.

Examples of the radical $R^2$ are —$(CH_2)$—, —$(CH_2)_2$—, —$(CH_2)_4$—, —$(CH_2)_6$—, —$(CH_2)_8$—, —$(CH_2)_{10}$—, $CH_3$ $CH_3$ —$CHCH_2CH$—, —$CH_2$—$CH_2$—$CH$=$CH$—$CH_2CH_2$— and —$C_6H_4$—, —$(CH_2)_2$—, —$(CH_2)_4$— and —$(CH_2)_6$— being preferred and —$(CH_2)_2$— being particularly preferred.

Examples of the radical A are the 4-pentenyl, 5-hexenyl, 7-octenyl, 9-decenyl, 5,9-decadienyl and 13-tetradecenyl radical, the 5-hexenyl and the 9-decenyl radical being preferred.

Examples of the radical $A^1$ are the 1,5-pentanediyl, 1,6-hexanediyl, 1,8-octanediyl, 1,10-decanediyl, 1,10-dec-5-enediyl and 1,14-tetradecanediyl radical, the 1,6-hexanediyl and the 1,10-decanediyl radical being preferred.

The siloxane copolymers according to the invention containing alkenyl groups have the advantage that even at a high average molecular weight they are homogeneously miscible with aromatic and aliphatic hydrocarbon solvents and with polysiloxanes, in particular with siloxanes having alkenyl functional groups, such as, siloxane copolymers having alkenyl functional groups according to the German application P 41 23 423.5 (Wacker-Chemie GmbH; filed on Jul. 15, 1991; corresponding U.S. Pat. No. 5,241,034, issued on Aug. 31, 1993). The siloxane copolymers according to the present invention have the advantage that they very rapidly form insoluble networks with organopolysiloxanes containing Si-bonded hydrogen.

According to the invention, 50% by weight solution of the siloxane copolymers containing alkenyl groups in toluene has a viscosity of 1 to 100 mm$^2$/s, at 25° C. or preferably 2 to 10 mm$^2$/s.

The siloxane copolymers according to the invention containing alkenyl groups preferably comprise SiO$_2$ units (Q units) and $R_3SiO_{\frac{1}{2}}$, $AR_2SiO_{\frac{1}{2}}$ and $O_{\frac{1}{2}}R_2Si$—$A^1$—$SiR_2O_{\frac{1}{2}}$ units (M units), in which R, A and $A^1$ have the meaning shown above. In its "alkylene" function, the last structural unit consists of one half of the symmetric radical $A^1$. According to the definition, two such "alkylene" functions are therefore linked to give the radical $A^1$, which represents a hydrocarbon block between two silicon atoms.

The siloxane copolymers containing alkenyl groups are preferably those of the formula $[R_3SiO_{\frac{1}{2}}]s$ $[AR_2SiO_{\frac{1}{2}}]_t$ $[A^1_{\frac{1}{2}}-SiR_2O_{\frac{1}{2}}]_u$ $[SiO_2]_v$ with a ratio of $(s+t+u)/v$ of 0.5 to 1.5. The ratio $t/s$ is preferably 0.05 to 0.2, which results in a very good cross-linking capacity with organosiloxanes which contain Si-bonded hydrogen. The hydrocarbon bridge content is defined by the quotient $u/(s+t)$, which is preferably in the range of from 0.01 to 0.2.

In the siloxane units (a) of the formula (I), b is preferably 0. Because of their preparation, the siloxane copolymers containing alkenyl groups can contain small amounts of alkoxy groups from incomplete hydrolysis and/or hydroxyl groups from incomplete condensation. Preferably, the alkoxy content is less than 5 mol percent, based on the total of all the silicon atoms in the siloxane copolymer, and the hydroxyl content is less than 0.5% by weight, based on the total weight of the siloxane copolymer.

The siloxane copolymers according to the invention containing alkenyl groups comprise on the average of at least two siloxane units of the formula $AR_2SiO_{\frac{1}{2}}$ per molecule.

The invention further relates to a process for the preparation of siloxane copolymers containing alkenyl group, which comprises in a first stage, reacting at least one silane of the formula $$R_dSi(OR^4)_{4-d} \qquad (IV)$$

in which

R has the above meaning, $R^4$ can be identical or different and represents an alkyl radical and

 is 0, 1, 2 or 3, and/or a partial hydrolyzate thereof, with the proviso that at least one silane of the formula (IV) where d is 0 and/or a partial hydrolyzate thereof is employed, and an organosiloxane of the formula $$A[SiR_2O(R_2SiO)_eR_2Si-A^1-]_fSiR_2O(R_2SiO)_eR_2SiA \qquad (V)$$

in which R, A and $A^1$ have the above meaning, e can be identical or different and represents 0 or an integer of from 1 to 100 and f is a number greater than 0 and less than or equal to 10, and optionally, an organosiloxane of the formula $$(R_2SiO)_g \qquad (VI)$$

in which

R has the one of the above meanings and g is an integer having a value of from 3 to 8, preferably 4 or 5, with water in the presence of an acid and optionally other substances, and in a second stage reacting the reaction mass obtained in the first stage in the presence of a base and optionally other substances.

The term "homogeneous reaction mass" in the description of the process is intended to relate to the liquid phase and to ignore salt formed during the neutralization.

Examples of the silanes of the formula (IV) employed in the process according to the invention are tetramethoxysilane, tetraethoxysilane, tetra-n-propoxysilane, methyltrimethoxysilane, 3-mercaptopropyltrimethoxysilane, 3-chloropropyltrimethoxysilane, phenyltrimethoxysilane, o-, m- and p-tolyltrimethoxysilane, propyltrimethoxysilane, methyltriethoxysilane, 3-mercaptopropyltriethoxysilane, 3-chloropropyltriethoxysilane, phenyltriethoxysilane, o-, m- and p-tolyltriethoxysilane, propyltrimethoxysilane, dimethyldiethoxysilane, dimethyldimethoxysilane and trimethylethoxysilane, tetraethoxysilane, methyltrimethoxysilane, methyltriethoxysilane, phenyltriethoxysilane, o-, m- and p-tolyltriethoxysilane and propyltriethoxysilane and/or partial hydrolyzates thereof preferably being employed and tetraethoxysilane and/or a partial hydrolyzate thereof being preferably employed.

If partial hydrolyzates of silanes of the general formula (IV) are employed in the process according to the invention, those having an average of up to 15 silicon atoms per molecule are preferred.

In the organosiloxane of the formula (V) employed according to the invention, e is preferably 0 or an integer of from 1 to 10, preferably 0, and f is on average a number of from preferably 0.1 to 3.0.

The organosiloxane of the formula (V) employed according to the invention can be prepared by known processes, for example, by the process described in the German application P 41 23 423.5 (corresponding U.S. Pat. No. 5,241,034) cited above, by reaction of dienes (1) of the formula $$CH_2=CR^3-R^2-CR^3=CH_2 \qquad (VII)$$

in which $R^2$ and $R^3$ have the above meaning, with α,w-dihydrodiorganosiloxanes (2) in the presence of a catalyst (3) which promotes addition of Si-bonded hydrogen onto an aliphatic double bond.

Examples of dienes (1) of the formula (VII) are 1,4-pentadiene, 1,5-hexadiene, 1,7-octadiene, 1,9-decadiene, 1,11-dodecadiene, 1,13-tetradecadiene, 1,5,9-decatriene, 3,5-dimethyl-1,6-heptadiene and 1,4-divinylbenzene, 1,5-hexadiene and 1,9-decadiene being preferred.

Examples of α,w-dihydrodiorganosiloxanes (2) are 1,1,3,3-tetramethyldisiloxane, $HSi(CH_3)_2[Si(CH_3)_2O]_8(CH_3)_2SiH$ and $HSi(CH_3)_2[Si(CH_3)_2O]_{50}(CH_3)_2SiH$, 1,1,3,3-tetramethyldisiloxane being preferred.

The diene (1) is employed in amounts such that the aliphatic double bond in the organic compound (1) is present in a molar ratio to the Si-bonded hydrogen in the organosiloxane (2) of preferably 1.5:1.0 to 10:1.0, more preferably 2.0:1.0 to 4.0:1.0.

Catalysts (3) which promote addition of Si-bonded hydrogen onto an aliphatic double bond and which can be employed are the same catalysts which it has also been possible to employ to date for promoting addition of Si-bonded hydrogen onto an aliphatic double bond. The catalysts (3) are preferably a metal from the platinum metals group or a compound or a complex from the platinum metals group. Examples of such catalysts are metallic and finely divided platinum, which can be on supports, such as silicon dioxide, aluminum oxide or activated charcoal, and compounds or complexes of platinum, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone platinum-vinylsiloxane complexes, such as platinum-1,3-divinyl-1,1,3,3-tetramethyldisiloxane complexes with or without a content of detectable inorganically bonded halogen, bis-(gamma-picoline)platinum dichloride, trimethylenedipyridineplatinum dichloride, dicyclopentadieneplatinum dichloride, dimethyl sulfoxide-ethyleneplatinum(II) dichloride, cyclooctadiene-platinum dichloride, norbornadieneplatinum dichloride, gamma-picoline-platinum dichloride, cyclopentadieneplatinum dichloride and reaction products of platinum tetrachloride with an olefin and primary amine or secondary amine or primary and secondary amine, such as the reaction product of platinum tetrachloride dissolved in 1-octene with sec-butylamine.

The catalyst (3) is preferably employed in amounts of 0.5 to 1000 ppm by weight (parts per million), preferably in amounts of 2 to 50 ppm by weight, in each case calculated as elemental platinum based on the total weight of organic compound (1) and organopolysiloxane (2).

The reaction of the diene (1) with the hydridosiloxane (2) is preferably carried out under a pressure of between 900 and 1100 hPa (absolute) and at a temperature of preferably 50° to 150° C., more preferably 60° to 120° C.

The reaction products of 1,5-hexadiene and/or 1,9-decadiene with 1,1,3,3-tetramethyldisiloxane are preferably employed as the organosiloxane of the formula (V) in the process according to the invention.

Examples of the organosiloxanes of the formula (VI) employed in the process according to the invention optionally are hexamethylcyclotrisiloxane, octamethylcyclotetrasiloxane and decamethylcyclopentasiloxane.

A mixture of organosiloxane of the formula (V), in particular one where R is the methyl radical, $R^2$ is the ethanediyl radical, $R^3$ is a hydrogen atom, e is 0 and f is on the average of 0.1 to 3.0, and a silane of the formula (IV) where d is 0, and/or a partial hydrolyzate thereof, in a molar ratio of monofunctional to tetrafunctional units of preferably 0.5:1 to 1.5:1.0 is advantageously employed in the first stage of the process according to the invention.

The acids employed in the first stage of the process according to the invention can be the same acids which have also been used to date for hydrolysis of silanes with alkoxy groups. Examples of the acids employed in the first stage of the process according to the invention are HCl, $HClO_4$, formic acid, acetic acid, propionic acid, p-toluenesulfonic acid, methanesulfonic acid, trifluoromethanesulfonic acid, dodecylbenzenesulfonic acid and poly-protic acids, such as $H_2SO_4$, $H_2SeO_4$, $H_3PO_4$, $H_3PO_3$, oxalic acid, maleic acid and malonic acid. Preferably, a poly-protic acid, particularly $H_2SO_4$ and $H_3PO_4$, more particular $H_2SO_4$, is employed in the first stage of the process according to the invention.

In the first stage of the process according to the invention, a silane of the formula (IV) and/or a partial hydrolyzate thereof, as a mixture with an organosiloxane for the formula (V) and optionally an organosiloxane of the formula (VI), is reacted with water and an acid, in particular a poly-protic acid, and optionally other substances. The acid is then partly neutralized in the homogeneous reaction mass by addition of a base. The base is added here in an amount such that, in the case of a diprotic acid, more than 50% by weight but less than 100% by weight, and in the case of a tri-protic acid, at least 34% by weight but less than 66% by weight of the acid employed is neutralized. All or some of the compound $R^4OH$, where $R^4$ has the above meaning, formed during the hydrolysis is then advantageously removed by distillation.

Water is employed in the first stage of the process in amounts of preferably 10 to 30% by weight, more preferably 10 to 20% by weight, based on the total weight of the reaction mass of the first stage before the distillation.

The poly-protic acid is employed in the first stage of the process in amounts of preferably 10 ppm to 10,000 ppm, more preferably 100 ppm to 5000 ppm, based on the total weight of the reaction mass of the first stage before the distillation.

The pH of the reaction mass in the first stage of the process before any addition of base is preferably in the range of from 0 to 3, and more preferably in the range of from 1 to 2.

In addition, up to preferably 0.01% by weight, based on the total weight of the reaction mass of the first stage before distillation, of other substances, for example, polymerization inhibitors, which are intended to prevent homopolymerization of olefinic starting substances, for example, the organosiloxane of the formula (V), can be employed in the first stage of the process according to the invention.

Examples of polymerization inhibitors which are employed optionally are hydroquinone, 4-methoxyphenol, pyrocatechol and BHT (2,6-di-t-butyl-4-methylphenol).

In the first stage of the process, before removal of the resulting compound $R^4OH$, where $R^4$ has the above meaning, by distillation, a base is added in an amount in which the pH is in the range of from 3.0 to 6.5, more preferably in the range of from 4.0 to 6.0.

Examples of bases are alkali metal hydroxides, such as sodium hydroxide and potassium hydroxide, alkali metal siliconates, such as sodium siliconate and potassium siliconate, amines, such as methylamine, dimethylamine, ethylamine, diethylamine, triethylamine and n-butylamine, and ammonium compounds, such as, tetramethylammonium hydroxide, tetra-n-butylammonium hydroxide and benzyltrimethylammonium hydroxide, sodium hydroxide, potassium hydroxide, methylamine, ethylamine, diethylamine and benzyltrimethylammonium hydroxide being preferred and sodium hydroxide, potassium hydroxide and methylamine being particularly preferred.

If desired, the base can be added as a mixture with water and/or a polar, water-soluble organic solvent. However, the dilution of the base should not be so high that the addition of the base leads to precipitation of the organopolysiloxane resin formed.

In the first stage of the process according to the invention, after any addition of a base, the compound $R^4OH$, where $R^4$ has the above meaning, is preferably distilled off at a rate such that the reaction mass remains homogeneous. Preferably, up to 90% by weight of the compound R4OH, based on the total weight of the compound $R^{40}H$ formed, where $R^4$ has the above meaning, is removed by distillation.

The reaction in the first stage of the process is preferably carried out at a temperature of 20° C. up to the boiling point of the reaction mass, more preferably at 60° C. up to the boiling point of the reaction mass, and under the pressure of the surrounding atmosphere, under a pressure of between 900 and 1100 hPa. Distillation of the compound $R^4OH$, where $R^4$ has the above meaning, is preferably carried out at the boiling point of the reaction mass under the pressure of the surrounding atmosphere.

When the first stage of the process according to the invention has ended, a base in an amount necessary to achieve a basic reaction mass and optionally other substances are added to the homogeneous reaction mass and the components are allowed to react.

The base is preferably added in the second stage of the process in an amount where the pH is in the range of from 8.0 to 14.0, preferably 9.0 to 13.0. The amount of base is generally in the range of from 0.05 to 1.0% by weight, based on the total weight of the reaction mass of the second stage before distillation, depending on the base employed.

Bases which can be employed in the second stage of the process are all the bases which can be employed in the first stage, preferably the same base as in the first stage being employed.

If desired, the base can be added as a mixture with water and/or a polar, water-soluble organic solvent. However, the dilution of the base should not be so high that addition of the base leads to precipitation of the organopolysiloxane resin formed.

A water-insoluble organic solvent is preferably employed in the second stage of the process.

The term water-insoluble organic solvent is intended to mean organic solvents which have a solubility at room temperature under the pressure of the surrounding atmosphere of not more than 1 g of solvent per liter of water.

Examples of water-insoluble organic solvents are hydrocarbons which form a low-boiling azeotrope with water, such as cyclohexane, methylcyclohexane, benzene, toluene, o-, m- or p-xylene and mesitylene, cyclohexane and methylcyclohexane being preferred.

If a water-insoluble organic solvent is employed in the second stage of the process according to the invention, it is used in at least an amount which is sufficient to maintain a homogeneous reaction mass. Preferably, the water-insoluble organic solvent is added in the number of parts by volume of alcohol and, optionally, water which have been distilled off in the first stage.

Examples of other substances employed optionally in the second stage are silanes of the formula (IV) in which all or some of the radicals R represent acid-sensitive organic radicals, such as, 3-aminopropyl, N-(2-aminoethyl)-3-aminopropyl and aminophenyl radicals.

The second stage of the process according to the invention is preferably carried out at a temperature between 50° C. and the boiling point of the reaction mass, more preferably between 60° C. and the boiling point of the reaction mass, and under a pressure of the surrounding atmosphere.

The water contained in the reaction mixture and the residual compound $R^4OH$, where $R^4$ has the above meaning, are removed completely or virtually completely during the azeotropic distillation carried out in the second stage of the process.

The distillation carried out in the second stage of the process is advantageously started immediately after addition of the base. The distillation is necessary to achieve a siloxane copolymer of high average molecular weight containing alkenyl groups, which contains hydroxyl and $R^4O$ groups to only a small extent.

Preferably, after the second stage of the process has ended, the homogeneous reaction mass is brought to a pH of between 6 and 8, preferably 7, by buffering by addition of a poly-protic acid and/or salts thereof. Water and any compound $R^4OH$, where $R^4$ has the above meaning, still present are distilled off and the salt which has precipitated is filtered off, it being possible, if desire, for some of any water-insoluble organic solvent present already to be distilled off before the filtration. In this case, the water-insoluble organic solvent is preferably distilled off before the filtration in an amount such that a concentrate having a content of siloxane copolymers of 50 to 80% by weight results.

Phosphoric acid, alkali metal dihydrogenphosphates, mixtures of phosphoric acid and alkali metal orthophosphates, mixtures of alkali metal dihydrogenphosphates and dialkali metal hydrogen-phosphates and mixtures of alkali metal dihydrogenphosphates and alkali metal orthophosphates are preferably employed as the poly-protic acid or salts thereof in this third stage of the process according to the invention which is to be carried out optionally, phosphoric acid, sodium dihydrogenphosphate and a mixture of phosphoric acid and sodium orthophosphate being particularly preferred.

The poly-protic acid and/or salts thereof can be employed in the form of aqueous solutions in the third stage of the process according to the invention which is to be carried out optionally.

The third stage of the process, if performed, is to be carried out at a temperature between 50° C. and the boiling point of the reaction mass, more preferably between 60° C. and the boiling point of the reaction mass, and under a pressure of the surrounding atmosphere.

When the third stage, if performed, is carried out the resulting reaction mass is freed from the water-insoluble organic solvent in a fourth stage, if it contains a water-insoluble organic solvent.

A preferred embodiment of the process according to the invention for the preparation of an organopolysiloxane resin contains a procedure in which in a first stage, at least one silane of the formula

$$R_dSi(OR^4)_{4-d} \qquad (IV)$$

in which

R has the above meaning, $R^4$ can be identical or different and represents an alkyl radical and d is 0, 1, 2 or 3, and/or a (partial) hydrolyzate thereof, with the proviso that at least one silane of the formula (IV) where d is 0 and/or a partial hydrolyzate thereof is employed, and an organosiloxane of the average formula

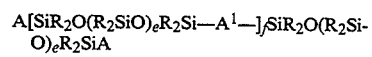

$$A[SiR_2O(R_2SiO)_eR_2Si—A^1—]_fSiR_2O(R_2SiO)_eR_2SiA \qquad (V)$$

in which R, A and $A^1$ have the above meaning, e is 0 or an integer of from 1 to 100 and f represents a number greater than 0 and less than or equal to 10, and optionally, an organosiloxane of the formula $$(R_2SiO)_g \qquad (VI)$$

in which R has the above meaning and g in an integer having a value of from 3 to 8, preferably 4 or 5, are reacted with water in the presence of a poly-protic acid and optionally other substances, the acid is then partially neutralized by addition of a base and at least some of the resulting compound $R^4OH$ is subsequently distilled off, in a second stage, the homogeneous reaction mass obtained in the first stage is reacted in the presence of a base and a water-insoluble organic solvent, and water and the compound R4OH are distilled off, in a third stage, the homogeneous reaction mass obtained in the second stage is brought to a pH of between 6 and 8 by buffering with a poly-protic acid and/or salts thereof, water and any compound $R^4OH$ still present are distilled off and the salt which has precipitated is filtered off, and optionally, in a fourth stage the homogeneous reaction mass obtained in the third stage is freed from water-insoluble organic solvent.

In a preferred embodiment of the process according to the invention, in a first stage, a silane of the formula (IV) where d is 0, in particular tetraethoxysilane, and/or a partial hydrolyzate thereof and an organosiloxane of the formula (V) are mixed with water and a poly-protic acid, in particular sulfuric acid, first at 60° C. and then at the boiling point of the reaction mass, in the case of tetraethoxysilane and/or a partial hydrolyzate thereof at 78° C., and under a pressure of between 900 and 1100 hPa, the resulting reaction mass is partially neutralized with a base and the compound $R^4OH$ is largely removed by distillation, in a second stage, the reaction mass obtained in the first stage is reacted in the presence of a base and a water-insoluble organic solvent, in particular cyclohexane or methylcyclohexane, water and the compound $R^4OH$ are simultaneously distilled off azeotropically under the pressure of the surrounding atmosphere, until the boiling point of the organic solvent is reached, in a third stage, the basic reaction mass obtained in the second stage is brought to a pH of between 6 and 8 with a phosphate buffer at 60° C. under a pressure of the surrounding atmosphere, water and any compound $R^4OH$ still present are distilled off azeotropically and the salt which has precipitated is filtered off, $R^4$ having the above meaning, and in a fourth stage, the water-insoluble organic solvent if present is removed.

In the process according to the invention, the individual components can be one type of these components or a mixture of at least two types of these components.

The process has the advantage that it is very easy to carry out and is readily reproducible. The siloxane copolymers containing alkenyl groups prepared by the process according to the invention have the advantage that they have a very low content of hydroxyl and/or alkoxy groups.

The siloxane copolymers according to the invention containing alkenyl groups, like the organopolysiloxanes containing Si-bonded vinyl groups, can be cross-linked with organopolysiloxanes containing Si-bonded hydrogen in the presence of hydrosilylation catalysts.

The siloxane copolymers containing alkenyl groups can be cross-linked with organic polymers containing mercapto groups. This can be effected thermally, by basic catalysis, but preferably by irradiation after addition of active free radical initiators. However, irradiation with electrons is more preferably carried out, addition of free radical initiators being unnecessary.

The invention further relates to cross-linkable compositions which comprise (A) a siloxane copolymer according to the invention containing alkenyl groups, (B) an organopolysiloxane containing Si-bonded hydrogen and (C) a catalyst which promotes addition of Si-bonded hydrogen onto an aliphatic double bond.

The cross-linkable compositions containing the siloxane copolymers according to the invention are preferably used for the production of coatings which repel tacky substances, for example for the production of release papers or release films.

Self-adhesive materials laminated with the release paper are produced by the off-line process or the in-line process. In the off-line process, the silicon composition is applied to the paper and cross-linked, and in a subsequent stage, usually after the release paper has been wound onto a roll and after the roll has been stored, an adhesive film, which lies on a label face paper, is applied to the coated paper and the laminate is then pressed together. In the in-line process, the silicone composition is applied to the paper and cross-linked, the silicone coating is coated with the adhesive, the label face paper is then applied to the adhesive and the laminate is finally pressed together. In the in-line process, it has been found that the adhesive, especially if it is an acrylic adhesive, bonds to the silicone coating on the release paper, if the adhesive is applied to the release paper coated with the silicone composition shortly after cross-linking of the silicone composition. This binding between the silicone coating and the adhesive is observed if, during production of the coatings, organopolysiloxanes containing vinyl groups are cross-linked with excess organopolysiloxanes containing Si-bonded hydrogen atoms.

Because of the very high cross-linking rates, the use of the compositions according to the invention for the production of release papers allows the use of a low percentage of constituent (B), even at a low temperature, for complete hardening of coatings which repel adhesives. The above mentioned effect therefore does not arise or arises to only a reduced extent.

One or more types of the siloxane copolymer (A) according to the invention containing alkenyl groups can be employed by themselves or in combination with siloxane polymers containing alkenyl groups in the compositions.

The same organopolysiloxanes containing Si-bonded hydrogen which it has been possible to employ in all the compositions known to date of organopolysiloxane containing vinyl groups, organopolysiloxane containing Si-bonded hydrogen and catalyst can also be employed as constituent (B) in the compositions according to the invention.

Organopolysiloxanes containing units of the formula

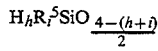 (VII)

in which
R⁵ can be identical or different and has a meaning given for R,
h is 0 or 1, on average of from 0.005 to 1.0,
i is 0, 1, 2 or 3, on average of from 1.0 to 2.0, and
the sum of h+i is not greater than 3, are preferably used a constituent (B).

Examples of organopolysiloxanes (B) are, in particular, copolymers of dimethylhydridosiloxane, methylhydridosiloxane, dimethylsiloxane and trimethylsiloxane units, copolymers of trimethylsiloxane, dimethylhydridosiloxane and methylhydridosiloxane units, copolymers of trimethylsiloxane, dimethylsiloxane and methylhydridosiloxane units, copolymers of methylhydridosiloxane and trimethylsiloxane units, copolymers of methylhydridosiloxane, diphenylsiloxane and trimethylsiloxane units, copolymers of methylhydridosiloxane, dimethylhydridosiloxane and diphenylsiloxane units, copolymers of methylhydridosiloxane, phenylmethylsiloxane, trimethylsiloxane and/or dimethylhydridosiloxane units copolymers of methylhydridosiloxane, dimethylsiloxane, diphenylsiloxane, trimethylsiloxane and/or dimethylhydridosiloxane units and copolymers of dimethylhydridosiloxane, trimethylsiloxane, phenylhydridosiloxane, dimethylsiloxane and/or phenylmethylsiloxane units.

The organopolysiloxanes (B) preferably contain at least three Si-bonded hydrogen atoms.

The organopolysiloxane (B) is preferably employed in amounts of from 0.5 to 3, in particular 1 to 2, gram atom(s) of Si-bonded hydrogen per mol of alkenyl group in the siloxane copolymers (A) containing alkenyl groups.

The same catalysts which have been employed for cross-linking organopolysiloxanes containing aliphatic double bonds with compounds containing Si-bonded hydrogen in the compositions known to date can also be used in the compositions according to the invention as the catalyst (C) which promotes addition of Si-bonded hydrogen onto an aliphatic double bond. The above mentioned catalysts (3) are preferably used as constituent (C).

Catalyst (C) is preferably employed in amounts of 5 to 500 ppm by weight, in particular 10 to 200 ppm by weight, calculated as elemental platinum metal and based on the total weight of the siloxane copolymer (A) and organopolysiloxane (B).

Examples of other constituents which can be co-used in the compositions according to the invention are agents which delay addition of Si-bonded hydrogen onto an aliphatic double bond at room temperature, so-called inhibitors (D), agents for adjusting the separation force, solvents, adhesion promoters and pigments.

All the inhibitors which have also been possible to use to date for the same purpose can also be used as inhibitors (D) in the compositions according to the invention. Examples of inhibitors and 1,3-divinyl-1,1,3,3-tetramethyldisiloxane, benzotriazole, dialkylformamide, dialkyl maleates, alkylthioureas, methyl ethyl ketoxime, organic or organosilicon compounds having a boiling point of at least 25° C. under 1012 mbar (absolute) and at least one aliphatic triple bond, such as 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, a mixture of diallyl maleate and vinyl acetate and maleic acid monoesters.

The inhibitor (D) is preferably employed in amounts of from 0.05 to 2% by weight, based on the total weight of siloxane copolymers (A) and organopolysiloxanes (B).

Examples of agents for adjusting the separation force of the coatings which repel tacky substances and are produced with the compositions according to the invention are silicone resins containing units of the formula

so-called MQ resins, in which R⁶ can be identical or different and is a hydrogen atom, a methyl radical, a vinyl radical or a radical A, where A has the above meaning. The molar ratio of units of the formula $R^6(CH_3)_2SiO_{\frac{1}{2}}$ to units of the formula $SiO_2$ is preferably from 0.6 to 2. The silicone resins are preferably employed in amounts of from 5 to 80% by weight, based on the total weight of siloxane copolymers (A) and organopolysiloxanes (B).

The solvents co-used in the compositions of the invention optionally can be the same solvents which have been possible to use in the compositions known to date of organopolysiloxanes containing Si-bonded vinyl groups, organopolysiloxanes containing Si-bonded hydrogen and catalyst which promotes addition of Si-bonded hydrogen onto an aliphatic double bond. Examples of such solvents are petroleum spirit, for example alkane mixtures having a boiling range of from 80° C. to 110° C. under 1012 mbar (absolute), n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are co-used, they are expediently employed in amounts of from 10 to 95% by weight, based on the weight of siloxane copolymers (A) containing alkenyl groups.

Although the sequence for mixing constituents (A), (B), (C) and optionally (D) is not critical, it has proved appropriate in practice to add constituent (C) last to the mixture of the other constituents.

Cross-linking of the compositions according to the invention is preferably carried out at from 50° C. to 150° C. One advantage of the compositions is that rapid cross-linking is already achieved at low temperatures. Circulating air drying cabinets, heating channels, heated rolls, heated plates or heat rays in the infrared range are preferably used for cross-linking by heating.

The compositions according to the present invention can also be cross-linked by irradiation with ultraviolet light or by irradiation with UV and IR light, as well as by heating. The ultraviolet light used is usually that having a wave length of 253.7 nm. There are a large number of commercially available lamps which emit ultraviolet light having a wave length of from 200 to 400 nm and which preferentially emit ultraviolet light having a wave length of 253.7 nm.

The compositions according to the present invention can be applied to the surfaces to be rendered repellent to tacky substances in any desired manner which is suitable for production of coatings from liquid substances and is known in many cases, for example by dipping, brushing, pouring, spraying, rolling on, printing, for example by means of an offset gravure coating device, knife- or doctor blade-coating or by means of an air brush.

The surfaces to be rendered repellent to tacky substances which can be treated in the context of the invention can be surfaces of any desired substances which are solid at room temperature and under atmospheric pressure. Examples of such surfaces are those of paper, wood, cork and films of plastic, for example polyethylene films or polypropylene films, woven and non-woven cloth of naturally occurring or synthetic fibers or glass fibers, ceramic objects, glass, metals, polyethylene-coated paper and board, including asbestos board. The above mentioned polyethylene can in each case by high pressure, medium pressure or low pressure polyethylene. The paper can be low quality types of paper, such as absorbent paper, including base kraft paper, i.e., paper which has not been pre-treated with chemicals and/or polymeric natural substances having a weight of from 60 to 150 g/m$^2$, unsized paper having a low degree of freeness, ligneous paper, non-satinized or non-calendered paper, paper which is smooth on one side due to the use of a dry glazing cylinder during its production, without other expensive measures, and is therefore called "one-sided machine smooth paper", non-coated paper or paper produced from waste paper, or recycled paper. However, the paper to be treated according to the invention can of course also be high quality types of paper, such as low-absorbent paper, sized paper, paper having a high degree of freeness, non-ligneous paper, calendered or satinized paper, glassine paper, parchment paper or pre-coated paper. The board can also be of high or low quality.

The compositions according to the invention are suitable, for example, for the production of release, covering and interleaving paper, including interleaving paper employed for the production of cast or decorative films or of foams, including those of polyurethane. The compositions are also suitable, for example, for production of release, covering and interleaving board, films and cloths, for finishing the reverse of self-adhesive tapes or self-adhesive films or of the printed sides of self-adhesive labels. The compositions according to the invention are also suitable for finishing packaging material, such as packaging material of paper, cardboard boxes, metal foils and drums, for example board, plastic, wood or iron, which is or are intended for storage and/or transportation of tacky goods, such as adhesives, sticky food-stuffs, for examples, cake, honey, sweets and meat, bitumen, asphalt, greased materials and crude rubber.

Another example of the present invention is the finishing of carriers for transferring pressure-sensitive adhesive layers in the so-called "transfer process".

The compositions according to the invention are suitable for production of the self-adhesive materials laminated with the release paper both by the off-line process and by the in-line process.

The compositions have the advantage that the siloxane copolymers according to the invention containing alkenyl groups which they contain allow high cross-linking rates even at a low temperature.

In the examples which follow, all the parts and percentages data relate to the weight, unless stated otherwise. Unless stated otherwise, the examples which follow are carried out under a pressure of the surrounding atmosphere under about 1000 hPa, and at room temperature at about 20° C., or at a temperature which is established when the reactants are brought together at room temperature without additional heating or cooling. All the viscosity data given in the examples are intended to relate to a temperature of 25° C.

EXAMPLE 1

A mixture of 185 g (1.14 mole) of hexamethyldisiloxane, 57 g (0.14 mole) of $H_2C=CH-(CH_2)_4-Si(CH_3)_2-O-[-Si(CH_3)_2-(CH_2)_6-Si(CH_3)_2-O]_{0.5}-Si(CH_3)_2-(CH_2)_4-CH=CH_2$, 450 g of tetraethoxysilane having an SiO$_2$ content of 40% (commercially obtainable under the name "TES" 40" from Wacker-Chemie GmbH, Munich; corresponds to 3.00 mole of SiO$_2$ units), 125 g of water and 16 g of 10% strength H$_2$SO$_4$ in water is heated under reflux at a temperature of 60° C. for a period of 1 hour and then at a temperature of 78° C. for 4 hours. A total of 2.70 moles of monofunctional units (2.28 moles of trimethylsiloxy, 0.28 mole of 5-hexenyl-dimethylsiloxy and 0.14 mole of bridging —(CH$_2$)$_3$—Si(CH$_3$)$_2$O$_\frac{1}{2}$-units) are employed, and the M:Q ratio is thus 0.90.

10 g of 10% strength NaOH in water are added to the reaction mixture, and 340 g of distillate are then removed in the course of 1 hour. 400 ml of cyclohexane and 6 g of 10% strength NaOH in water are then added to the reaction mass, and 80 g of a water/ethanol mixture are then distilled off azeotropically for a period of 1 to 2 hours, until an overhead temperature of 80° C. is reached. Thereafter, the reaction mixture, which is homogeneous except for the sodium sulfate which has precipitated, is acidified with 6 g of H$_3$PO$_4$ (85% strength in water) and stirred at 60° C. for a period of 1 hours, 100 g of 15% strength Na$_3$PO$_4$.12H$_2$O solution in water are then added and the mixture is stirred at 60° C. for a further 15 minutes. Thereafter, 95 g of a water/ethanol mixture are distilled off azeotropically for a period of 60 to 90 minutes until an overhead temperature of 80° C. is reached, and a further 100 ml of cyclohexane are removed by distillation.

After the precipitated sodium salts of the acids used have been separated off by filtration, 650 g of a 62% strength neutral resin solution in cyclohexane are obtained. The content of residual ethoxy groups in the resin is 3.9 mole percent, based on the total silicon. The yield of resinous siloxane copolymer containing alkenyl groups is thus 95% of theory. The viscosity of a 50% strength solution of this siloxane copolymer in cyclohexane is 6.0 cSt.

EXAMPLE 2

The procedure described in Example 1 is repeated with the modification that, instead of the starting material mixture of Example 1, a mixture of 179 g (1.10 moles) of hexamethyldisiloxane, 64.5 g (0.14 mole) of $H_2C=CH-(CH_2)_4-Si(CH_3)_2-O-[-Si(CH_3)_2-(CH_2)_6-Si(CH_3)_2-O]_{0.75}-Si(CH_3)_2-(CH_2)_4-CH=CH_2$, 450 g of tetraethoxysilane having an SiO$_2$ content of 40% (commercially obtainable under the name "TES 40" from Wacker-Chemie GmbH, Munich; corresponds to 3.00 moles of SiO$_2$ units), 125 g of water and 16 g of 10% strength H$_2$SO$_4$ in water is used as the starting substance. In turn, 2.70 moles in total of monofunctional units (2.21 moles of trimethylsiloxy, 0.28 moles of 5-hexenyl-dimethylsiloxy and 0.21 mole of bridging —(CH$_2$)$_3$—Si(CH$_3$)$_2$O$_\frac{1}{2}$ units) are employed;

the M:Q ratio is 0.90, the molar content of bridging monofunctional units being increased and the molar content of monofunctional trimethylsiloxy units being reduced to the same extent.

After filtration, 640 g of 63% strength neutral resin solution in cyclohexane are obtained. The content of residual ethoxy groups in the resin is 4.3 mole percent, based on the total silicon. The yield of resinous siloxane copolymer containing alkenyl groups is 94% of theory. The viscosity of a 50% strength solution of this siloxane copolymer in cyclohexane is 7.8 cSt.

Comparison Example 1

The procedure described in Example 1 is repeated with the modification that, instead of the starting material mixture of Example 1, a mixture of 196 g (1.21 moles) of hexamethyldisiloxane, 41.7 g (0.14 mole) of 1,3-bis(5-hexenyl)tetramethyldisiloxane, 450 g of tetraethoxysilane having an SiO₂ content of 40% (commercially obtainable under the name "TES 40" from Wacker-Chemie GmbH, Munich; corresponds to 3.00 moles of SiO₂ units), 125 g of water and 16 g of 10% strength H₂SO₄ in water is used as the starting substance. In turn, 2.70 moles in total of monofunctional units (2.42 moles of trimethylsiloxy and 0.28 mole of 5-hexenyl-dimethylsiloxy units) are employed; the M:Q ratio is 0.90, no bridging monofunctional units being employed here. After filtration, 640 g of a 62% strength neutral resin solution in cyclohexane are obtained. The content of residual ethoxy groups in the organopolysiloxane resin is 3.3 mole percent, based on the total silicon. The yield of organopolysiloxane resin is thus 94% of theory. The viscosity of a 50% strength solution of the organopolysiloxane resin in cyclohexane is 4.0 cSt.

EXAMPLE 3

A mixture of 242 g (1.49 moles) of hexamethyldisiloxane, 78 g (0.14 mole) of H₂C=CH—(CH₂)₄—Si(CH₃)₂—O—[—Si(CH₃)₂—(CH₂)₆—Si(CH₃)₂—O]₁.₂—Si(CH₃)₂—(CH₂)₄—CH=CH₂, 450 g of tetraethoxysilane having an SiO₂ content of 40% (commercially obtainable under the name "TES 40" from Wacker-Chemie GmbH, Munich; corresponds to 3.00 moles of SiO₂ units), 110 g of water and 33 g of 10% strength H₂SO₄ in water is heated under reflux at a temperature of 60° C. for a period of 1 hour and then at a temperature of 78° C. for 8 hours. 3.60 moles in total of monofunctional units (2.98 moles of trimethylsiloxy, 0.28 mole of 5-hexenyl-dimethylsiloxy and 0.34 mole of bridging —(CH₂)₃—Si(CH₃)₂O½ units) are employed, and the M:Q ratio is thus 1.20. 20 g of 10% strength NaOH in water are added to the reaction mixture and 330 g of distillate are then removed in the course of 1 hour. 500 ml of cyclohexane and 10 g of 10% strength NaOH in water are then added to the reaction mass, and 100 g of a water/ethanol mixture are subsequently distilled off azeotropically over a period of 1 to 2 hours, until an overhead temperature of 80° C. is reached. Thereafter, the reaction mixture, which is homogeneous except for the sodium sulfate which has precipitated, is acidified with 6 g of H₃PO₄ (85% strength in water) and stirred at 60° C. for a period of 1 hour, 100 g of 15% strength Na₃PO₄.12H₂O solution in water are then added and the mixture is stirred at 60° C. for 15 minutes. Thereafter, 100 g of a water/ethanol mixture are distilled off azeotropically over a period of 60 to 90 minutes, until an overhead temperature of 80° C. is reached, and an additional 100 ml of cyclohexane are removed by distillation.

After filtration, 790 g of a 60% strength neutral resin solution in cyclohexane are obtained. The content of residual ethoxy groups in the resin is 3.8 mole percent, based on the total silicon. The yield of resinous siloxane copolymer containing alkenyl groups is thus 94% of theory. The viscosity of a 50% strength solution of this siloxane copolymer in cyclohexane is 4.2 cSt.

Comparison Example 2

The procedure described in Example 3 is repeated with the modification that, instead of the starting material mixture of Example 3, a mixture of 269 g (1.66 moles) of hexamethyldisiloxane, 41.7 g (0.14 mole) of 1,3-bis(5-hexenyl)tetramethyldisiloxane, 450 g of tetraethoxysilane having an SiO₂ content of 40% (commercially obtainable under the name "TES 40" from Wacker-Chemie GmbH, Munich; corresponds to 3.00 moles of SiO₂ units), 110 g of water and 33 g of 10% strength H₂SO₄ in water is used as the starting substance. As in Example 3, 3.60 moles in total of monofunctional units (3.32 moles of trimethylsiloxy and 0.28 mole of 5-hexenyl-dimethylsiloxy units) are employed; the M:Q ratio is 1.20, no bridging monofunctional units being employed here. After filtration, 770 g of a 61% strength neutral resin solution in cyclohexane are obtained. The content of residual ethoxy groups in the organopolysiloxane resin is 3.7 mol percent, based on the total silicon. The yield of organopolysiloxane resin is thus 95% of theory. The viscosity of a 50% strength solution of the organopolysiloxane resin in cyclohexane is 3.2 cSt.

What is claimed is:

1. A siloxane copolymer containing alkenyl groups, comprising
(a) siloxane units of the formula

$$R_aSi(OR^1)_nO_{\frac{4-(a+b)}{2}} \quad (I)$$

in which

R is identical or different and represents aliphatically saturated organic radicals, R¹ is identical or different alkyl radicals, which can be substituted by ether oxygen atoms, or a hydrogen atom, a is 0, 1, 2 or 3, b is 0, 1 or 2 wherein the sum of a+b is not greater than 3, and at least two siloxane units (a) where a+b=0 are present per molecule (b) at least one siloxane unit per molecule of the formula

$$AR_cSiO_{\frac{3-c}{2}} \quad (II)$$

in which

R is the same as above c is 0, 1 or 2 and

A represents a radical of the formula —CH₂CH R³—R²—CR³=CH₂ in which

R² is a divalent hydrocarbon radical having 1 to 25 carbon atoms and

R³ is a hydrogen atom or an alkyl radical, and (c) an average of at least one siloxane unit per molecule of the formula $$O_{\frac{3-c}{2}}R_cSi-A^1-SiR_cO_{\frac{3-c}{2}} \quad (III)$$

in which

R and c are the same as above and $A^1$ represents a radical of the formula —CH$_2$CH-R$^3$—R$^2$—CHR$^3$CH$_2$— where R$^2$ and R$^3$ are the same as above.

2. The siloxane copolymer containing alkenyl groups as claimed in claim 1, containing SiO$_2$ units and R$_3$SiO$_{\frac{1}{2}}$, AR$_2$SiO$_{\frac{1}{2}}$ and O$_{\frac{1}{2}}$R$_2$Si—A$^1$—SiR$_2$O$_{\frac{1}{2}}$ units, in which R, A and A$^1$ have the meaning given in claim 1.

3. The siloxane copolymer containing alkenyl groups as claimed in claim 1, having a siloxane copolymer of the formula [R$_3$SiO$_{\frac{1}{2}}$]$_s$ [AR$_2$SiO$_{\frac{1}{2}}$]$_t$ [A$^1_{\frac{1}{2}}$—SiR$_2$O$_{\frac{1}{2}}$]$_u$ [SiO$_2$]$_v$ with a ratio of (s+t+u)/v of 0.5 to 1.5.

4. The siloxane copolymer containing alkenyl groups as claimed in claim 3, in which the ratio (s+t+u)/v is 0.5 to 1.5, the ratio t/s is 0.05 to 0.2 and the ratio u/(s+t) is 0.01 to 0.2.

5. A process for the preparation of a siloxane copolymer containing alkenyl groups, comprising reacting at least one silane of the formula $$R_dSi(OR^4)_{4-d} \quad (IV)$$

in which

R is identical or different and represents aliphatically saturated organic radicals, R$^4$ is identical or different and represents an alkyl radical and d is 0, 1, 2 or 3, and/or a partial hydrolyzate thereof, with the proviso that at least one silane of the formula (IV) where d is 0 and/or a partial hydrolyzate thereof is employed, and an organosiloxane of the formula $$A[SiR_2O(R_2SiO)_eR_2Si-A^1-]_fSiR_2O(R_2SiO)_eR_2SiA \quad (V)$$

in which R, A an A$^1$ have the above meaning given in claim 1, e is identical or different and represents 0 or an integer of from 1 to 100 and f is a number greater than 0 and less than or equal to 10, and optionally, an organosiloxane of the formula $$(R_2SiO)_g \quad (VI)$$

in which

R is identical or different and represents aliphatically saturated organic radicals and g is an integer having a value of from 3 to 8, with water in the presence o an acid, and in a second stage the reaction mass obtained in the first stage is reacted in the presence of a base.

6. The process as claimed in claim 5, wherein a reaction product of 1,5-hexadiene and/or 1,9-decadiene with 1,1,3,3-tetramethyldisiloxane is present as the organosiloxane of the formula (V).

7. The process as claimed in claim 5, wherein in a first stage at least one silane of the formula $$R_dSi(OR^4)_{4-d} \quad (IV)$$

in which

R, R$^4$ and d have the meaning given in claim 5, and/or a partial hydrolyzate thereof, with the proviso that at least one silane of the formula (IV) where d is 0 and/or a partial hydrolyzate thereof is present, and an organosiloxane of the formula $$A[SiR_2O(R_2SiO)_eR_2Si-A^1-]_fSiR_2O(R_2SiO)_eR_2SiA \quad (V)$$

in which R, An and A$^1$, e and f have the meaning given in claim 5, and optionally an organosiloxane of the formula $$(R_2SiO)_g \quad (VI)$$

in which R and g have the meaning given in claim 5, are reacted with water in the presence of a poly-protic acid, the acid is then partly neutralized by addition of a base and at least some of the resulting compound R$^4$OH is distilled off, in a second stage the homogeneous reaction mass obtained in the first stage is reacted in the presence of a base and a water-insoluble organic solvent, and water and the compound R$^4$OH are distilled off, in a third stage the homogeneous reaction mass obtained in the second stage is brought to a pH of between 6 and 8 with a poly-protic acid and/or salts thereof, water and any compound R$^4$OH still present are distilled off and the salt which has precipitated is filtered off, and optionally, in a fourth stage the homogeneous reaction mass obtained in the third stage is feed from water-insoluble organic solvent.

8. A cross-linkable composition comprising (A) a siloxane copolymer containing alkenyl groups, as claimed in claim 1, (B) an organopolysiloxane containing Si-bonded hydrogen, and (C) a catalyst which promotes addition of Si-bonded hydrogen onto an aliphatic double bond.

9. A coating which repels tacky substances consisting of a cross-linkable composition as claimed in claim 8.

* * * * *

UNITED STATES PATENT AND TRADEMARK OFFICE
CERTIFICATE OF CORRECTION

PATENT NO. : 5,386,007
DATED : January 31, 1995
INVENTOR(S) : Christian Herzig, Michael Geck, Alfred Rengstl, Friedrich Hockemeyer and Helmut Oswaldbauer It is certified that error appears in the above-indentified patent and that said Letters Patent is hereby corrected as shown below:

In Claim 1, column 16, line 40, delete "$R_aSi(OR^1)_nO_{\frac{4-(a+b)}{2}}$" and insert in lieu of --- $R_aSi(OR^1)_bO_{\frac{4-(a+b)}{2}}$ ---.

Signed and Sealed this

Twenty-first Day of November, 1995

BRUCE LEHMAN

Attest:

Attesting Officer

Commissioner of Patents and Trademarks